Patented Oct. 3, 1950

2,524,513

UNITED STATES PATENT OFFICE 2,524,513

VINYL 2,3,4,5-TETRACHLOROBENZOATE AND POLYMERS THEREFROM

William E. Cass, Schenectady, N. Y., assignor to General Electric Company, a corporation of New York No Drawing. Application December 15, 1948, Serial No. 65,504

6 Claims. (Cl. 260—86.1)

This invention relates to the production of new materials and more particularly to vinyl 2,3,4,5-tetrachlorobenzoate and polymers and copolymers therefrom. These new materials have valuable and characteristic properties that make them especially suitable for use in industry, for example, in molding, laminating, casting, coating and adhesive applications and for other purposes.

In addition to the monomeric material vinyl 2,3,4,5 - tetrachlorobenzoate and homopolymers therefrom, the scope of the present invention also includes compositions comprising an interpolymer of ingredients including (1) vinyl 2,3,4,5-tetrachlorobenzoate and (2) at least one other organic compound copolymerizable with the said ester and containing a polymerizable —CH=C— grouping, more particularly a $CH_2=C<$ grouping, for example, styrene, vinyl acetate, methyl acrylate, ethyl methacrylate, etc.

Various methods may be employed to prepare the vinyl 2,3,4,5-tetrachlorobenzoate with which the present invention is concerned. One method which I have found to be satisfactory comprises reacting 2,3,4,5-tetrachlorobenzoic acid with a vinyl ester of a saturated aliphatic monocarboxylic acid in the presence of a suitable catalyst.

This new vinyl ester may be polymerized separately or mixed with other polymerizable materials and interpolymerized therewith. The homogeneous and heterogeneous polymers vary from viscous masses to rubbery and hard solid bodies depending, for example, upon the extent of polymerization and the particular polymerizable or other modifying agent, if any, which is incorporated therewith. Heat, light or heat and light may be used to effect polymerization although under such conditions the rate of polymerization is relatively slow. Therefore, to accelerate the polymerization, I prefer to use a catalyst accompanied by heat, light or heat and light. Examples of polymerization catalysts which may be used are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic and the aliphatic-aromatic acid series, e. g., benzoyl peroxide, acetyl benzoyl peroxide, etc., various per-compounds such as perborates, persulfates, perchlorates, etc. Benzoyl peroxide is the preferred catalyst.

Any suitable amount of catalyst may be used, but in general the catalyst concentration will be within the range of from about 0.1 to 2.0 per cent, by weight, of the whole. The rate of polymerization and the properties of the final product vary with the time, temperature, and, if a catalyst is used, also with the catalyst concentration. Polymerization of the individual ester or of polymerizable compositions containing this ester may be effected at from room temperature (20° to 30° C.) to temperatures above 100° C., for example 130° C., but ordinarily I use temperatures within the range of 60° to 120° C. in causing polymerization.

The homopolymer of vinyl 2,3,4,5-tetrachlorobenzoate in its high molecular weight form is a hard, clear material which unexpectedly is relatively insoluble in solvents in which the unchlorinated vinyl benzoate is soluble. Even copolymers of vinyl 2,3,4,5-tetrachlorobenzoate with copolymerizable materials containing a single $CH_2=C<$ grouping exhibited this unexpected low degree of solubility in various solvents. In addition, the use of vinyl 2,3,4,5-tetrachlorobenzoate for copolymerization with other copolymerizable materials results in an improvement in the softening point of the latter even though relatively small amounts of the vinyl 2,3,4,5-tetrachlorobenzoate are employed.

Although the amount of vinyl 2,3,4,5-tetrachlorobenzoate may be varied within wide limits, good results are obtained when it is present in an amount equal to from about 1 to 99 per cent, by weight, of the total weight of the vinyl 2,3,4,5-tetrachlorobenzoate and the other copolymerizable material or materials. For many purposes I prefer that the vinyl 2,3,4,5-tetrachlorobenzoate comprises from about 10 to 90 per cent of the total weight of the copolymerizable ingredients. It is, of course, understood that I do not intend to be limited to the amount of vinyl 2,3,4,5-tetrachlorobenzoate which may be employed in practicing my invention since, as will be apparent to those skilled in the art, larger or smaller amounts may be employed without departing from the scope of the invention. In general the proportions will be varied depending upon the particular properties desired in the interpolymer and any increase or decrease in the proportion of vinyl 2,3,4,5-tetrachlorobenzoate will be reflected in a commensurate change in the properties of the copolymers.

Vinyl 2,3,4,5-tetrachlorobenzoate can be cross-linked by compounds such as divinyl or diallyl compounds, or maleate or fumarate polyesters to form products that have increased heat resistance. Such products tend toward further insolubility as the per cent of divinyl compound, diallyl compound, or unsaturated polyester compound increases. The copolymers of vinyl 2,3,4,5-tetrachlorobenzoate and other vinyl compounds which contain only one $CH_2=C<$ group are essentially thermoplastic and can be treated in general as any thermoplastic material. For instance, they can be injection or compression molded, oriented and fused.

In order that those skilled in the art may better understand how the present invention can be practiced, the following examples are given by way of illustration and not by way of limitation. All parts are by weight.

EXAMPLE 1

*Preparation of vinyl 2,3,4,5-tetrachlorobenzoate*

To a mixture of 52 parts 2,3,4,5-tetrachlorobenzoic acid and 172 parts redistilled vinyl acetate were added 1.2 parts mercuric acetate and 0.2 part sulfuric acid. The resultant mixture was heated by an electric mantel and distilled slowly (low take-off ratio) through a packed column for 2½ hours. During this period the reaction temperature rose from about 70° C. to 92° C. and about 100 parts of distillate was collected. The mixture was allowed to cool and 0.6 part anhydrous sodium acetate was added to decompose the active $HgSO_4$ catalyst. The excess vinyl acetate and by-products were distilled under a vacuum of about 100 mm. and the residue was redistilled under high vacuum and the liquid product boiling at 140–156° C. under 0.25 mm. collected. This latter liquid was washed with warm dilute sodium bicarbonate solution, separated from the aqueous layer and allowed to cool to yield a solid product. This material was dissolved in acetone and precipitated with water to yield about 27 parts (47 per cent yield based on the 2,3,4,5-tetrachlorobenzoic acid) of fairly pure product which on recrystallization several times from methyl alcohol and a small amount of ethyl acetate yielded the pure vinyl 2,3,4,5-tetrachlorobenzoate in the form of white needles having a melting point of 48.5–49.0° C. and a boiling point of about 121–124° C. at 0.2 mm. Analysis of the compound disclosed it to contain 49.4 per cent chlorine which when compared with the theoretical value of 49.6 per cent indicated that essentially pure vinyl 2,3,4,5-tetrachlorobenzoate was obtained.

EXAMPLE 2

Vinyl 2,3,4,5-tetrachlorobenzoate was mixed with about 0.3 per cent, by weight, benzoyl peroxide and placed in a glass tube, sealed under nitrogen and heated at 70° C. for about 24 hours. There was thus obtained a hard, clear polymer which had a Rockwell hardness of 80 (determined on a Rockwell superficial hardness tester using a ⅛″ ball and 15 kilogram load). This homopolymer was swollen but insoluble when held from two to four days in such solvents as benzene, acetone, pyridine, cyclohexanone, chlorobenzene, ethyl acetate, orthodichlorobenzene and dioxane. It was also insoluble in toluene even after immersion therein for thirty days.

EXAMPLE 3

In this example vinyl 2,3,4,5-tetrachlorobenzoate was copolymerized with various copolymerizable materials containing a $CH_2=C<$ grouping at 70° C. by placing the vinyl 2,3,4,5-tetrachlorobenzoate with the particular copolymerizable material and catalyst in a glass tube and sealing it under nitrogen. Unless specified otherwise, the benzoyl peroxide catalyst, which was employed in all cases, was present in an amount equal to about 0.3 per cent, by weight, of the weight of the comonomers. In each case, with the exception of several instances described below, the heating time was 24 hours.

*Table*

| Sample No. | Parts Vinyl 2,3,4,5-Tetrachlorobenzoate | Parts Vinyl Benzoate | Parts Methyl Methacrylate | Parts Vinyl Acetate | Parts Styrene | Appearance | Rockwell Hardness |
|---|---|---|---|---|---|---|---|
| 1 | | 50 | | | | Soft, somewhat sticky | (3) |
| 2 | 33 | 17 | | | | Hard, clear | 75 |
| 3 | 25 | 25 | | | | ----do---- | 75 |
| 4 | | | 50 | | | ----do---- | 65–70 |
| 5 | 25 | | 25 | | | Hard, slightly cloudy | 75 |
| 6 | | | | 50 | | Tough, clear | (3) |
| 7 | 25 | | | 25 | | Hard, slightly cloudy | 70–75 |
| 8 | | | | | 1 50 | Hard, tough | 65 |
| 9 | | | | | 2 50 | Hard, clear, tough | 70 |
| 10 | 1 25 | | | | 25 | Soft, sticky | (3) |
| 11 | 2 25 | | | | 25 | Hard, slightly cloudy | 65 |

1 Heating was conducted for 48 hours.
2 The amount of benzoyl peroxide employed was 0.6 per cent, by weight, and the heating was conducted for 144 hours.
3 Sample too soft to measure relative hardness.

Tests of the homopolymers of vinyl benzoate, methyl methacrylate, vinyl acetate and styrene described in the table with regard to their solubility revealed that all the homopolymers were soluble in either acetone or mixtures of acetone and toluene, whereas the copolymers with vinyl 2,3,4,5-tetrachlorobenzoate were swollen but insoluble in the same solvents.

Various polymerizable compounds in addition to those heretofore specifically mentioned may be simultaneously polymerized or copolymerized with 2,3,4,5-tetrachlorobenzoate to obtain new and useful synthetic compositions. For instance, any compound containing a $CH_2=C<$ grouping (polymerizable $CH_2=C<$ grouping) in its molecular structure, that is, compounds containing a single $CH_2=C<$ grouping or a plurality (two, three, four or more) of $CH_2=C<$ groupings in the structure of the individual compound. Examples of such compounds are the esters, nitriles and amides of acrylic and alpha-substituted acrylic acids, vinyl esters and halides, methylene malonic esters, mono- and polyallyl compounds, e. g., the di-, tri-, tetra- (and higher) allyl derivatives. For instance, the copolymerizable material may be a polyallyl ester of an inorganic polybasic acid, of a saturated or unsaturated aliphatic polycarboxylic acid or of an aromatic polycarboxylic acid. Specific examples of compounds that may be employed, in addition to those hereinbefore mentioned, are:

Benzyl acrylate
Benzyl methacrylate
Methyl alpha-chloroacrylate
Ethyl alpha-bromoacrylate
Propyl alpha-chloroacrylate
Para-chlorostyrene
Allyl acrylate
Allyl methacrylate
Methallyl acrylate
Di- and tri-chlorostyrenes
Chlorinated divinylbenzenes
Vinyl methyl ether
Vinyl ethyl ether
Divinyl ether
Methylene methyl malonate
Para-chlorobenzyl acrylate
Diallyl fumarate
Diethyl itaconate
Diallyl citraconate
Divinyl biphenyl
Vinyl methyl ketone
Cyclopentadiene
2-chloro-butadiene-1,3 (chloroprene)
2,3-dimethyl-butadiene-1,3
Chlorinated methylstyrenes
Chlorinated vinylnaphthalenes
Hexadiene-1,5
Octadiene-1,4
2-cyano-butadiene-1,3
Methylene ethyl malonate
Vinyl chloride
Vinylidene chloride
Diethylene glycol dimethacrylate (diethylene dimethacrylate)
Glyceryl triacrylate
Ethylene glycol diacrylate (ethylene diacrylate)
Diethylene itaconate
Diethyl maleate
Diethyl fumarate
Dimethallyl maleate
Dimethallyl itaconate
Dimethallyl phthalate
Amyl acrylate
Hexyl methacrylate
Triallyl citrate
Triallyl aconitate
Vinyl acetate
Vinyl propionate
Vinyl butyrate Additional examples of copolymerizable materials which may be employed in the practice of this invention may be more particularly disclosed in D'Alelio and Underwood Patent 2,449,804, issued September 21, 1948, and assigned to the same assignee as the present invention.

The copolymers of this invention have a wide variety of commercial applications. They may be used alone or in combination with other insulating materials, e. g., paper, fabric materials formed of glass fibers, cotton, silk, rayon, nylon, etc., sheet asbestos, cellulose esters (e. g., cellulose acetate, cellulose acetobutyrate, etc.), cellophane, etc., as dielectric materials in electrical apparatus. For instance, capacitors and other electrical devices may contain a dielectric material comprising the products of polymerization of a polymerizable mass containing vinyl 2,3,4,5-tetrachlorobenzoate as an essential ingredient. Paper-insulated capacitors wherein paper impregnated with a composition comprising a copolymer of vinyl 2,3,4,5-tetrachlorobenzoate constitutes the dielectric material is a more specific example of the use of a composition of my invention in electrical applications. Such capacitors may be produced in accordance with conventional manufacturing technique, for instance, as described and illustrated in Clark Patent No. 1,931,373, with particular reference to a different impregnant. My new copolymers also may be employed as cable impregnants, in impregnating electrical coils, as filling compound in potheads and cable joints, and in numerous other electrical applications. The device to be treated may be impregnated or filled with the polymerizable mixture (e. g., mixture of monomers, mixture of partial polymers, or mixture of monomer and partial polymer), and polymerization effected in situ.

What I claim as new and desire to secure by Letters Patent of the United States is:

1. Vinyl 2,3,4,5-tetrachlorobenzoate.
2. Polymeric vinyl 2,3,4,5-tetrachlorobenzoate.
3. A composition comprising an interpolymer of ingredients comprising (1) vinyl 2,3,4,5-tetrachlorobenzoate, and (2) a different organic compound copolymerizable with the said ester containing a $CH_2=C<$ grouping.
4. A composition comprising an interpolymer of ingredients including vinyl 2,3,4,5-tetrachlorobenzoate and an organic compound copolymerizable with the said ester and containing a plurality of $CH_2=C<$ groupings.
5. A composition comprising an interpolymer of ingredients comprising (1) vinyl 2,3,4,5-tetrachlorobenzoate and (2) methyl methacrylate.
6. A composition comprising an interpolymer of ingredients comprising (1) vinyl 2,3,4,5-tetrachlorobenzoate and (2) vinyl acetate.

WILLIAM E. CASS.

REFERENCES CITED

The following references are of record in the file of this patent:

UNITED STATES PATENTS

| Number | Name | Date |
|---|---|---|
| 2,403,213 | D'Alelio | July 2, 1946 |
| 2,465,316 | Mowry et al. | Mar. 22, 1949 |